Figure 1:
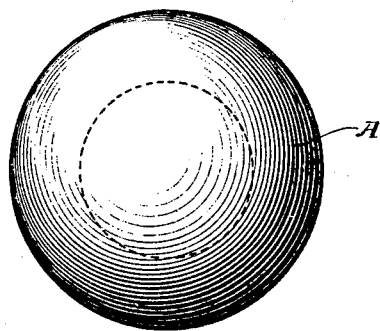
Figure 2:
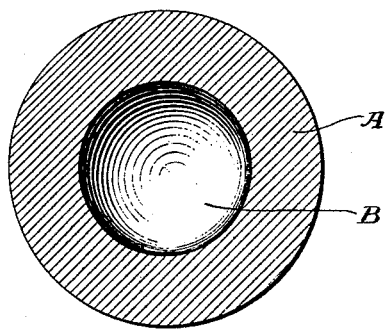
Figure 3:
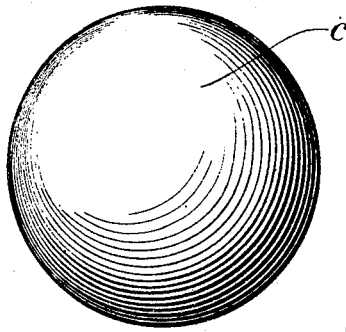

No. 868,762. PATENTED OCT. 22, 1907.
W. D. CROW.
PROCESS OF MANUFACTURING CONCRETE.
APPLICATION FILED FEB. 26, 1907.

UNITED STATES PATENT OFFICE.

WILLIAM D. CROW, OF EAST ORANGE, NEW JERSEY.

PROCESS OF MANUFACTURING CONCRETE.

No. 868,762.   Specification of Letters Patent.   Patented Oct. 22, 1907.

Application filed February 26, 1907. Serial No. 359,508.

*To all whom it may concern:*

Be it known that I, WILLIAM D. CROW, a citizen of the United States, residing in the city of East Orange, in the county of Essex, State of New Jersey, have invented a new and useful Improvement in Artificial Stone, of which the following is a specification.

The object of my invention is to produce an artificial stone (particularly concrete) of maximum strength at a minimum cost. This object I attain by the use of burnt clay or other refractory material of substantially spherical conformation, as the aggregate of the concrete as distinguished from the matrix.

I am aware that blocks of refractory material of conventional form have been used in the manufacture of concrete, but I secure a considerable advantage by the employment of a substantially spherical aggregate, as will more clearly appear from the description.

Referring to the drawing, Figure I is a hollow sphere, Fig. II a sectional view of the sphere taken through its center; Fig. III is a solid sphere.

A represents the sphere in Fig. I; B a hollow. C is the solid sphere, Fig. III.

The invention in its essence consists in the use of burnt clay, or other refractory material molded as described in my application for Letters Patent executed even date herewith, to be hereafter filed in the Patent Office of the United States. The employment of these spherical forms is a distinct advantage, for a sphere being symmetrical on any diameter, always presents a definite and constant form of surface in any direction, and has a definite and constant cross section on any diametrical plane. Hence spherical forms have a constant value as elements of strength in a concrete mixture, and therefore simplify the manufacture of the concrete by providing an aggregate of knowable strength. Spheres in mass, when in contact at all possible tangent points, can have but one relation to the adjacent spheres, and the proportion of solids to voids or internal hollows is a determinable and unvariable quantity. This fact permits the necessary amount of matrix to be determined accurately in advance. A hollow sphere has the additional advantage of being an arched or domed form, in which form the material is subjected practically to only direct strains from external stresses, thereby permitting the use of a minimum amount of material, which results in a minimum of weight, in proportion to the strength obtained. In nature many combinations of lightness and strength occur by reason of an arched form; as in the shell of an egg, the human skull, wing cases of insects, etc.

Having thus described my invention, what I claim is:

1. In an artificial stone, the combination of a matrix, and an aggregate, said aggregate consisting of refractory material of substantially spherical forms.

2. In an artificial stone, the combination of a matrix, an aggregate, said aggregate consisting of refractory material of substantially spherical forms containing an internal hollow, substantially as described.

3. In an artificial stone, the combination of a matrix and an aggregate embedded in said matrix, said aggregate consisting of a plurality of substantially spherical forms of refractory material, substantially as described.

4. In an artificial stone, the combination of a matrix, and an aggregate embedded in said matrix, said aggregate consisting of a plurality of hollow spherical forms of refractory material, substantially as described.

5. In an artificial stone, the combination of a matrix, and an aggregate, said aggregate consisting of burnt clay of substantially spherical forms.

6. In an artificial stone, the combination of a matrix, an aggregate, said aggregate consisting of burnt clay of substantially spherical forms containing an internal hollow, substantially as described.

7. In an artificial stone, the combination of a matrix, and an aggregate embedded in said matrix, said aggregate consisting of a plurality of substantially spherical forms of burnt clay, substantially as described.

8. In an artificial stone, the combination of a matrix, and an aggregate embedded in said matrix, said aggregate consisting of a plurality of hollow spherical forms of burnt clay, substantially as described.

In witness whereof I have hereunto set my hand this 21st day of February, 1907.

WILLIAM D. CROW.

In the presence of—
LIONEL MOSES,
CLARENCE G. GALSTON.